United States Patent [19]

Meise et al.

[11] Patent Number: 4,481,539
[45] Date of Patent: Nov. 6, 1984

[54] ERROR CORRECTION ARRANGEMENT FOR IMAGERS

[75] Inventors: William H. Meise, Wrightstown, Pa.; Robert A. Dischert, Burlington, N.J.

[73] Assignee: RCA Corporation, New York, N.Y.

[21] Appl. No.: 458,634

[22] Filed: Jan. 17, 1983

Related U.S. Application Data

[63] Continuation of Ser. No. 242,268, Mar. 10, 1981, abandoned.

[51] Int. Cl.$^3$ .......................... H04N 5/36; H04N 5/21
[52] U.S. Cl. ..................................... 358/213; 358/163
[58] Field of Search ............... 358/212, 213, 220, 222, 358/223, 163, 167

[56] References Cited

U.S. PATENT DOCUMENTS

| | | | |
|---|---|---|---|
| 3,624,286 | 11/1971 | Bosomworth | 358/213 |
| 3,856,989 | 12/1974 | Weimer | 358/213 |
| 3,904,818 | 9/1975 | Kovac | 358/213 |
| 4,036,690 | 7/1977 | Hoagland | 358/213 |
| 4,145,721 | 3/1979 | Beaudouin | 358/213 |
| 4,220,971 | 9/1980 | Lambeth | 358/167 |
| 4,237,488 | 12/1980 | Takemura | 358/213 |

FOREIGN PATENT DOCUMENTS

| | | | |
|---|---|---|---|
| 56722 | 5/1979 | Japan | 358/213 |
| 124627 | 9/1979 | Japan | 358/213 |
| 96766 | 7/1980 | Japan | 358/213 |

Primary Examiner—Tommy P. Chin
Attorney, Agent, or Firm—E. M. Whitacre; H. I. Steckler; L. C. Edelman

[57] ABSTRACT

Two or more CCD imagers, which have random defects are optically coupled to form a single image. The CCD's are in registry. Because of the random nature of the location of the defects, the defective photosensors of one imager are aligned with good photosensors of another. Memories keep track of which locations of which CCD are defective. The imagers are operated synchronously and the signals from good photosensor locations are summmed for improved signal-to-noise ratio. When a location is addressed at which one imager has a defective photosensor, the respective memory decouples it from the good photosensor of the other imager. The signal level is restored for that pixel by increasing the gain of a preamp by the correct amount. If the imagers are made from the same mask, they may have almost identically corresponding defective photosensors. Then one imager is mounted upside-down relative to the other and scanned backwards so the defects do not coincide.

10 Claims, 3 Drawing Figures

ERROR CORRECTION ARRANGEMENT FOR IMAGERS

This is a continuation of application Ser. No. 242,268, filed Mar. 10, 1981, now abandoned.

BACKGROUND OF THE INVENTION

The present invention relates to imagers having discrete photosensors, and more particularly to imaging apparatus using such imagers where there may be defective photosensors.

Present CCD (charge coupled device) imagers suffer from low yields due to imperfections and defects in the integrated circuit chips from which they are fabricated. Various schemes have been used to correct for the signal disturbances that result from such defects. For example U.S. Pat. No. 3,904,818 shows a system that in effect does dropout compensation. The system detects when a photosensor provides excessive dark current, and if so, substitutes a signal that is the average of signals provided by photosensors surrounding the defective one. However, an average of signals from surrounding photosensor may not be a close enough approximation to be satisfactory. Also, other photosensors in the area may be affected by the defect and averaging may not produce an acceptable correction. Other schemes use a ROM (read only memory) programmed with correction factors for the signal from each photosensor. However, if a particular photosensor is totally defective, the signal therefrom cannot be corrected.

It is therefore an object of the present invention to correct for the effects of defective photosensors of a discrete photosensor imager.

SUMMARY OF THE INVENTION

An imaging method an apparatus comprising imaging a scene onto a plurality of imagers having a plurality of discrete photosensors, said photosensors being subject to defects, obtaining signals from said imagers, said signals being subject to portions which are not representative of the scene due to said defects, and combining said signals to reduce the visible effects of said portions.

DESCRIPTION OF THE DRAWINGS

FIG. 1 is a block diagram of a first embodiment of the invention while

DETAILED DESCRIPTION

Figure 1:
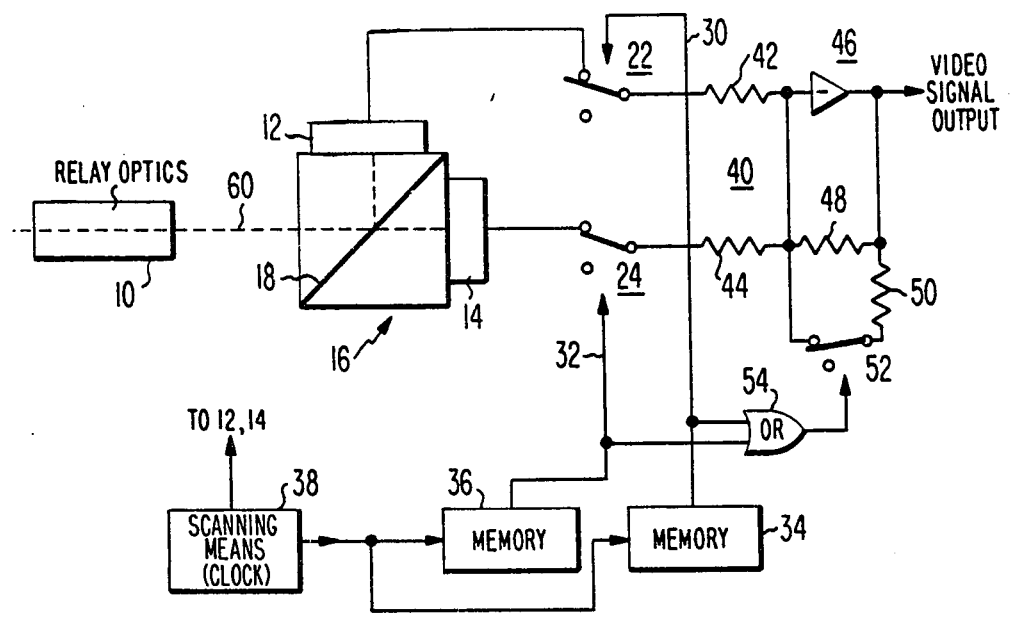
Figure 1A:
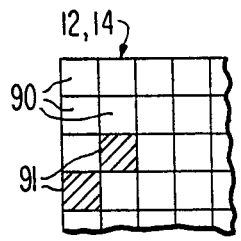
FIG. 1A shows an imager used in FIG. 2.

FIG. 1 shows a block diagram of the invention wherein a light beam 60 from a scene being viewed passes through relay optics 10 into prism arrangement 16. Arrangement 16 comprises two contiguous triangular cross-section prisms with a semi-reflecting half-silvered mirror 18 disposed therebetween. CCD or other imagers 12 and 14 have discrete photosensors 90, shown in FIG. 1A which in accordance with the invention, need not be defect free as shown by defective photosensors 91, inexpensive, are bonded in registration to two perpendicular sides of arrangement 18 and at 45 degree angles with respect to mirror 18. Thus half the light in beam 60 is applied to each of imagers 12 and 14. Relay optics 10 is designed and spaced from arrangement 18 so that the scene will be in focus in the plane of the photosensors 90 of imagers 12 and 14. An arrangement for bonding photosensor array to a prism with the imagers in registration is described in U.S. patent application Ser. No. 180,897 filed Aug. 25, 1980, now U.S. Pat. No. 4,323,918 in the name of S. L. Bendell.

Clock generator 38 synchronously causes scanning to take place within imagers 12 and 14 so that both imagers are simultaneously providing a signal from corresponding photosensors. Most of the time there will be good signals from both imagers 12 and 14, and therefore it is desired to add the signals from the two imagers together for improved signal-to-noise ratio. To achieve this, the signals from imagers 12 and 14 are applied to switches 22 and 24 respectively, which switches are normally in the positions shown. The output signals from switches 22 and 24 are applied to adder 40 including resistors 42 and 44. The output of adder 40 is coupled to inverting amplifier 46. Resistors 48 and 50 normally both provide negative feedback for amplifier 46 due to switch 52 being in the position shown. The video output signal is derived from the output of amplifier 46.

Memories 34 and 36 store the locations of defective photosensors 91 of imagers 12 and 14 respectively, said memories being driven synchronously with said imagers by clock generator 38. When memory 34 indicates that a defective photosensor 91 of imager 12 is being read out, it provides a signal on conductor 30 that switches switch 22 to the position not shown in FIG. 1 so that no signal from imager 12 is provided to adder 40. Simultaneously therewith, the signal on conductor 30 is passed by OR gate 54 to switch 52. Switch 52 switches to the position not shown in FIG. 1. Thus only resistor 48 provides the negative feedback, which feedback is thereby reduced, thereby increasing the gain by a factor of two to maintain peak video signal levels. Similarly, when memory 36 indicates that a defective photosensor 91 is being read out from imager 14, a signal is applied to conductor 32 to switch 24 to switch it to the position not shown in FIG. 1, thereby preventing the signal from being applied to adder 40. Further, the signal on conductor 32 is applied to gate 54 to achieve the gain increase as explained above. Thus at least one imager will always supply a signal to adder 40, provided that the defects do not coincide, which is normally rare. Thus, in the embodiment of FIG. 1 the signals from the imagers are combined by time-division means during a defect and are amplitude combined otherwise.

In the above discussion it has been assumed that defective photosensors 91 of imagers 12 and 14 do not coincide. However, repetitive defects on a die arising from systematic errors, such as mask defects, produce CCD imagers with systematic defects (defects all in the same location). In accordance with one aspect of the invention, one of each pair of the imagers 12 and 14 with systematic errors is mounted upside-down relative to the other, and is scanned backwards to eliminate the systematic nature of the errors, making them appear random so as not to occur at the same location.

If the half-silvered mirror divides the light beam 60 by other than one half, one imager receives more light than the other and the signal from one will be larger than from the other. This may be corrected by changing the values of the summing resistors 42 and 44 to correspond to the differing outputs.

Figure 2:
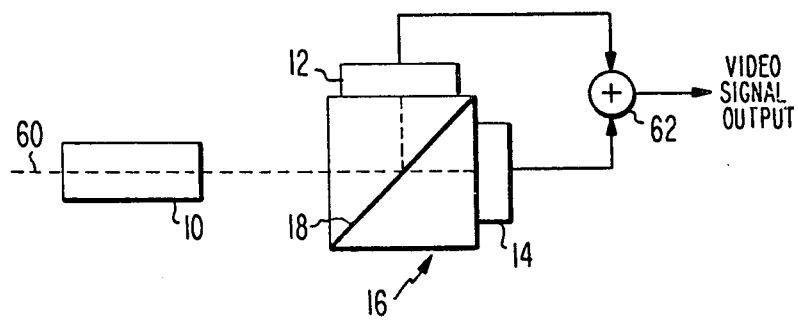
FIG. 2 is a block diagram o a second embodiment of the invention.

A second embodiment of the invention is shown in FIG. 2, wherein corresponding reference numbers are applied to corresponding elements. In this embodiment, the output signals from imagers 12 and 14 are applied to adder 62 and summed together. Thus at least one photosensor of a pair of corresponding photosensors will provide an output signal, assuming that the defects do not coincide. At each location at which a photosensor of an imager is defective, the signal from the defective imager is averaged with the signal from the corresponding good photosensor of the second imager, thereby reducing the magnitude of the error. Again one of the imagers can be mounted upside down, if there are corresponding defects.

Other embodiments of the invention will be apparent to those skilled in the art. For example, the imagers may be mounted by means other than bonding to the faces of prisms, and any number of imagers may be used, rather than the two shown. For color operation, an arrangement such as that shown may be used to respond to one or more of the primary colors.

Further, in a color camera two or more (preferably three) imagers can be used, each imager being responsive to a different spectral distribution. Therefore if there is a defect in one imager, a signal from a defect-free imager can be combined with the signal from the defective photosensor. In particular, the imagers can be responsive to complementary colors, such as magenta, cyan, and yellow, which makes each imager responsive to two primary colors, thereby making the signal combining process more effective.

What is claimed is:

1. An imaging apparatus comprising:
    a pair of imagers for imaging a scene, one of said imagers being mounted upside-down relative to the other imager, each imager having a plurality of discrete photosensors, said photosensors being subject to defects;
    means for obtaining signals from the discrete photosensors of each of said imagers to allow producing a visible image, whereby portions of said signals are not representative of the scene due to said defects; and
    means for adding corresponding portions of said signals obtained from said imagers for producing a combined signal having improved signal-to-noise ratio resulting from adding corresponding portions of said signals which are representative of corresponding portions of said scene, and also having a reduced magnitude of error resulting from adding portions of one of said signals which are not representative of the scene due to said defects with corresponding portions of the other of said signals which are representative of corresponding portions of said scene, wherein said obtaining means comprises means for synchronously scanning said one of said imagers backwards relative to the other imager for simultaneously obtaining signals from each of said imagers having corresponding portions representative of signal from discrete photosensors having corresponding portions of said scene imaged thereon.

2. Imaging apparatus comprising:
    a plurality of imagers for imaging a scene, each imager having a plurality of discrete photosensors providing signals, said photosensors being subject to defects;
    memory means which when scanned in synchronism with said plurality of imagers provides defect location signals for discrete photosensors which are defective;
    clock means coupled to said imagers and to said memory means for synchronously scanning said imagers for enabling generation of photosensor signals by said imagers and for enabling said memory means for providing said defect location signals; and
    combining means coupled to said memory means to receive said defect location signals from said memory means and coupled to said imagers for adding the photosensor signals from said discrete photosensors of said plurality of imagers which are representative of corresponding portions of said scene imaged thereon to form a combined output signal when said defect location signal is not present, for increasing the signal-to-noise ratio of said combined output signal, and for providing an output signal from said defect-free photosensor only when said defect location signal is present.

3. An apparatus as claimed in claim 2, wherein said plurality of imagers is two, one of said imagers being mounted upside-down relative to the other imager, and said scanning means scans said one of said imagers backwards relative to the other imager for simultaneously obtaining signals from both said imagers representative of corresponding portions of said scene.

4. Apparatus as claimed in claim 2 further comprising means for amplifying said combined output signal; means for establishing a selected absolute value for said amplifying means; and means coupled to said memory means for modifying said absolute value when said defect location signal is present.

5. An apparatus as claimed in claim 4, wherein said amplifying means further comprises an amplifier, and said modifying means comprises means for changing the amplification of said amplifier when said defect location signal is present.

6. An apparatus as claimed in claim 4, wherein said amplifying means comprises an amplifier having negative feedback, and said modifying means comprises means for changing the amount of negative feedback applied to said amplifier.

7. An apparatus as claimed in claim 2, wherein said pluralities of imagers are two in number.

8. An imaging method comprising:
    imaging a scene onto a plurality of imagers, each imager having a plurality of discrete photosensors providing signals, said photosensors being subject to defects;
    providing defect location signals from a memory means corresponding to defective photosensors of said imagers when scanned in synchronism with said imagers;
    scanning said imagers and said memory means in sychronism;
    adding the photosensor signals from corresponding discrete photosensors of said plurality of imagers having corresponding portions of said scene imaged thereon to form a combined output signal when said photosensors are defect-free for increasing the signal-to-noise ratio of said combined output signal; and
    providing an output signal from a defect free photosensor only when said defect location signal is present.

9. A method as claimed in claim 8 wherein said plurality of imagers is two; one of said imagers being mounted upside-down relative to the other imager, and said scanning step comprises scanning said one of said imagers backwards relative to the other imager for simultaneously obtaining signals from both said imagers representative of corresponding portions of said scene.

10. Apparatus as claimed in claim 8, further comprising means for amplifying said combined output signal by an absolute value, said absolute value being modified in accordance with whether or not said defect location signal is present.

* * * * *

UNITED STATES PATENT AND TRADEMARK OFFICE
CERTIFICATE OF CORRECTION

PATENT NO. : 4,481,539

DATED : November 6, 1984

INVENTOR(S) : William H. Meise & Robert A. Dischert

It is certified that error appears in the above-identified patent and that said Letters Patent is hereby corrected as shown below:

Column 1, line 49, "o" should be -- of --

Column 1, line 62, after "91," insert -- and therefore are --

Signed and Sealed this

Twenty-first Day of May 1985

[SEAL]

Attest:

DONALD J. QUIGG

Attesting Officer

Acting Commissioner of Patents and Trademarks